(12) United States Patent
Bennemann et al.

(10) Patent No.: US 11,007,933 B2
(45) Date of Patent: May 18, 2021

(54) OPERATING DEVICE HAVING PLURALITY LED AND A FIBER OPTICAL UNIT FOR A TRANSPORTATION VEHICLE

(71) Applicant: VOLKSWAGEN AKTIENGESELLSCHAFT, Wolfsburg (DE)

(72) Inventors: Mark Bennemann, Falkensee (DE); Carsten Temming, Braunschweig (DE); Johannes Rhede, Berlin (DE); Jannes Menck, Wolfenbüttel (DE)

(73) Assignee: VOLKSWAGEN AKTIENGESELLSCHAFT

(*) Notice: Subject to any disclaimer, the term of this patent is extended or adjusted under 35 U.S.C. 154(b) by 0 days.

(21) Appl. No.: 16/717,590

(22) Filed: Dec. 17, 2019

(65) Prior Publication Data
US 2020/0189461 A1 Jun. 18, 2020

(30) Foreign Application Priority Data
Dec. 18, 2018 (DE) ...................... 10 2018 222 203.7

(51) Int. Cl.
| | | |
|---|---|---|
| *B60Q 9/00* | (2006.01) | |
| *G08G 1/14* | (2006.01) | |
| *F21V 8/00* | (2006.01) | |
| *G08G 1/056* | (2006.01) | |
| *G08G 1/01* | (2006.01) | |

(52) U.S. Cl.
CPC ........... *B60Q 9/002* (2013.01); *G02B 6/0006* (2013.01); *G08G 1/0133* (2013.01); *G08G 1/056* (2013.01); *G08G 1/143* (2013.01)

(58) Field of Classification Search
CPC .......... G06F 3/0421; G02B 6/06; G02B 6/04; G02B 6/0006; G02B 6/0008; B60K 2370/143; B60K 37/02
See application file for complete search history.

(56) References Cited

U.S. PATENT DOCUMENTS

| | | |
|---|---|---|
| 4,692,739 A | 9/1987 | Dorn |
| 7,033,086 B2 | 4/2006 | Ebbecke |
| 9,207,851 B1 | 12/2015 | Han |
| 2006/0086896 A1 | 4/2006 | Han |
| 2009/0254869 A1 | 10/2009 | Ludwig et al. |
| 2009/0314128 A1 | 12/2009 | Rick |
| 2011/0148760 A1* | 6/2011 | Reigneau ............ G06F 3/03543 345/157 |
| 2013/0308133 A1* | 11/2013 | Sun ......................... G01J 3/506 356/402 |

FOREIGN PATENT DOCUMENTS

| | | |
|---|---|---|
| DE | 3424412 A1 | 1/1986 |
| DE | 20018732 U1 | 1/2001 |
| DE | 10257128 B3 | 5/2004 |

(Continued)

*Primary Examiner* — Hongmin Fan
(74) *Attorney, Agent, or Firm* — Barnes & Thornburg LLP

(57) ABSTRACT

An operating device for a transportation vehicle for operating a function of a transportation vehicle, wherein the operating device includes LEDs arranged adjacent to one another forming a matrix, wherein a processing unit ascertains whether light of at least one first LED is reflected and/or radiated because of an operating action at least into a second LED.

15 Claims, 5 Drawing Sheets

(56) References Cited

FOREIGN PATENT DOCUMENTS

| | | |
|---|---|---|
| DE | 202006014751 U1 | 12/2006 |
| DE | 102008035107 A1 | 12/2009 |
| DE | 102014203780 A1 | 9/2015 |
| DE | 102016109147 A1 | 11/2017 |
| EP | 0528463 A1 | 2/1993 |
| EP | 1764674 A2 | 3/2007 |
| EP | 2174833 A2 | 4/2010 |
| EP | 2981446 A1 | 2/2016 |

* cited by examiner

OPERATING DEVICE HAVING PLURALITY LED AND A FIBER OPTICAL UNIT FOR A TRANSPORTATION VEHICLE

PRIORITY CLAIM

This patent application claims priority to German Patent Application No. 10 2018 222 203.7, filed 18 Dec. 2018, the disclosure of which is incorporated herein by reference in its entirety.

SUMMARY

Illustrative embodiments relate to an operating device for a transportation vehicle, in particular, for operating a function of a transportation vehicle, wherein the operating device comprises a plurality of LEDs arranged adjacent to one another like a matrix, for example, wherein a processing unit is provided to ascertain whether light of at least one first LED of the plurality of the LEDs is reflected and/or radiated because of an operating action at least into a second LED of the plurality of the LEDs. Illustrative embodiments also relate to a transportation vehicle having an operating device. Illustrative embodiments further relate to a method for operating an operating device.

BRIEF DESCRIPTION OF THE DRAWINGS

Disclosed embodiments are described in relation to the following figures in which.

DETAILED DESCRIPTION

Figure 1:
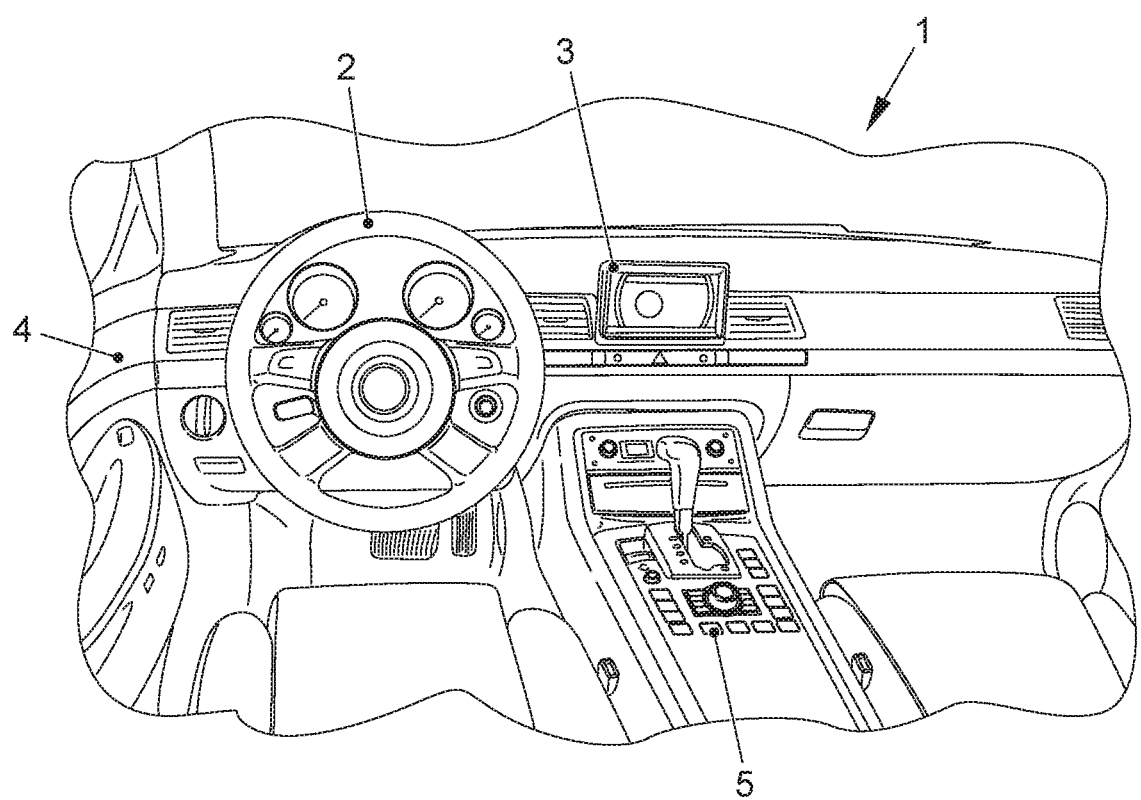
FIG. 1 shows an exemplary embodiment of a transportation vehicle in an interior view.

U.S. Pat. No. 9,207,851 B1 discloses a matrix made of LEDs, which is arranged behind the liquid crystal layer of an LCD device. For example, the matrix made of LEDs can be a matrix made of white LEDs. Such a matrix can contain one or more rows and one or more columns, each of which contains one or more LEDs which are configured to emit white light. The matrix made of white LEDs is optically and mechanically configured to function as background lighting for the LCD device, while it is also electrically configured to operate its LEDs both in the light emission mode and also in the light detection mode.

US 2006/0086896 A1 discloses an arrangement of red-green-blue LEDs having three chips in a matrix row/column configuration. Each LED can have one shared cathode and three separate anodes. Instead of a single line driver for each line, three can be provided, for example, one for the anode of each red, green, and blue chip. The shared cathodes for all LEDs in a given column can be connected jointly to drivers. Each row can have a row read amplifier, which can be connected to a red anode bus of an amplifier. A sampling procedure can be carried out sequentially, for example, each one column. All blue line drivers can be activated, while all red and green line drivers can be deactivated. This causes only the blue chips in the LEDs to act as emitters and to generate light. The red chips can be used as detectors by the read amplifier of each row. If a finger is in contact with one of the LEDs in such a column, light can be reflected from the finger and be received by the red chips. After a brief delay (for example, one microsecond), so that the values of the amplifiers can be adapted, an ADC can carry out a conversion for each input channel, and the results can be stored.

Disclosed embodiments simplify and/or improve the operation of a transportation vehicle.

This is achieved by an operating device for a transportation vehicle for operating a function of a transportation vehicle, wherein the operating device comprises a plurality of LEDs arranged (in particular, like a matrix) adjacent to one another (in particular, essentially like a matrix), wherein a processing unit is provided to ascertain whether light of at least one first LED of the plurality of the LEDs is reflected and/or radiated because of an operating action at least into a second LED of the plurality of the LEDs, wherein it is beneficially provided that a fiber optical unit is arranged above the plurality of the LEDs. The first LED is thus an LED in the light emission mode and the second LED is an LED in the light detection mode. A change is performed between these two modes rapidly, specifically at a speed such that the change is not visible to the human eye. Similarly as in the teaching disclosed in U.S. Pat. No. 9,207,851 B1 and/or in US 2006/0086896 A1, the LEDs change at such a high frequency between light emission mode and light detection mode that this change is not perceptible to the human eye. In the simplest case, the role of the LED changes in such a way that it is ascertained whether light of the second LED of the plurality of the LEDs is reflected and/or radiated into the first LED of the plurality of the LEDs. Light is then radiated into a fiber of the fiber optical unit in turn by the first LED in the plurality of the LEDs and it is in turn checked by the second LED of the plurality of the LEDs whether this light beam is reflected and radiated by a fiber of the fiber optical unit into the second LED. However, it can also be provided that a change is performed using different LEDs, so that, for example, subsequently a third LED or a further LED of the plurality of the LEDs emits light in the direction of the first LED or second LED.

A fiber optical unit in the meaning of this disclosure is an optical component which consists of many transparent fibers arranged in parallel, in particular, glass fibers, as light guides (TIR—total internal reflection), which are fused, for example, to one another as a support plate to form a mechanically homogeneous block. A fiber optical unit in the meaning of this disclosure can also be referred to as a fiber optical unit or fused fiber optics. A fiber optical unit in the meaning of this disclosure can comprise a plurality of light guides which, at least on the side of the fiber optical unit facing toward the plurality of the LEDs is aligned (essentially) perpendicularly and/or orthogonally to the side of the fiber optical unit facing toward the plurality of the LEDs or to the plane in which the plurality of the LEDs are arranged.

A fiber optical unit in the meaning of this disclosure can be designed as a fiber bundle, as a fiber bundle having partial fiber bundles, or as a fiber plate. In one design of the fiber optical unit in the meaning of this disclosure, light guides are used which are not fused with one another, but rather consist of flexible individual fibers located loosely adjacent to one another, which are only geometrically strictly ordered and fixedly enclosed at an input and output side. The transmitted image is resolved pixel by pixel, there are two common arrangements of the pixels: hexagonal or orthogonal. The spacing of the individual pixels is, for example, 4-10 μm. Each individual fiber consists, for example, as in the case of a light guide of a core glass and an enveloping low-refraction cladding glass. Additionally, strands made of black (absorbent) glass are arranged in between, for example, to hold back straying scattered light. A fiber optical unit in the meaning of this disclosure can have enlarging or shrinking properties (taper). The cylindrical block (fiber optical unit) resulting after the fusing is then heated once again and drawn, tapers in the middle, and can be severed in the resulting waist. In this manner, a taper, i.e., a fiber optical unit for a shrinking or enlargement deviating from the 1:1 scale, can be produced. A fiber optical unit in the meaning of this disclosure can be semi-transparently coated.

A function of a transportation vehicle in the meaning of this disclosure can be an infotainment system, a navigation system, a telephone or a telephone interface, a window lifter, operating elements for a side mirror, a sliding roof, inter alia. An operating action in the meaning of this disclosure can be the touching, in particular, with a finger, of an operating surface of the fiber optical unit provided for the operation. An arrangement above the plurality of the LEDs in the meaning of this disclosure means that the fiber optical units or the fibers of the fiber optical units are designed in such a way that the LEDs radiate light into the fibers of the fiber optical unit.

An LED in the meaning of this disclosure can also be an LED having color filter and/or an LED which comprises a color filter. It is provided that LED in the meaning of this disclosure is also to be understood as meaning OLED. An LED in the meaning of this disclosure can also be a QDOT or a laser. It is provided that the color white is formed by phosphor.

A processing unit in the meaning of this disclosure can comprise, for example, circuits and/or analysis circuits as are disclosed in U.S. Pat. No. 9,207,851 B1 and US 2006/0086896 A1.

In a further disclosed embodiment, the fiber optical unit comprises a side facing toward the plurality of the LEDs and a side facing away from the plurality of the LEDs (side facing toward a user of the operating device) and/or the side facing toward the plurality of the LEDs, wherein the side facing away from the plurality of the LEDs and/or the side facing toward the plurality of the LEDs comprises a curved region. In a further disclosed embodiment, the fiber optical unit is at least partially curved. The curvature can be convex and/or concave. The coupling surface, i.e., the side of the fiber optical unit facing toward the plurality of the LEDs, can also be formed stepped. The fiber optical unit can be bent in a further disclosed embodiment (2½ D).

In a further disclosed embodiment, the fiber optical unit splits into at least two partial fiber bundles in the direction toward the side facing away from the plurality of LEDs and/or in the direction toward the side facing toward the plurality of the LEDs. In a further disclosed embodiment, the fiber optical unit splits into at least three partial fiber bundles in the direction toward the side facing away from the plurality of LEDs and/or in the direction toward the side facing toward the plurality of the LEDs. In a further disclosed embodiment, the fiber optical unit splits into at least four partial fiber bundles in the direction toward the side facing away from the plurality of LEDs and/or in the direction toward the side facing toward the plurality of the LEDs.

In at least one disclosed embodiment, it can be provided that fibers of the fiber optical unit have a different diameter. It can thus be provided that a fiber optical unit has one fiber having a substantially larger diameter than one fiber of a group of fibers, which is also part of the fiber optical unit. A different functionality can be implemented by the different diameters. It can thus be provided, for example, that an on/off function is assigned with the fiber having the substantially larger cross section, while swiping is to be detected by the fibers having small cross section.

In a further disclosed embodiment, the first LED has a first light emission spectrum, for example, predominantly in the infrared range, and a second LED has a second light emission spectrum, wherein the first light emission spectrum differs from the second light emission spectrum.

In a further disclosed embodiment, the operating device has at least one third LED having a third light emission spectrum and at least one fourth LED having a fourth light emission spectrum, wherein the at least first light emission spectrum differs from the at least third light emission spectrum and from the at least fourth light emission spectrum, wherein the at least second light emission spectrum differs from the at least third light emission spectrum and from the at least fourth light emission spectrum, wherein the at least third light emission spectrum differs from the at least fourth light emission spectrum, wherein the processing unit is designed to ascertain whether light of the at least first LED is reflected and/or radiated because of an operating action into the at least second LED, into the at least third and/or the at least fourth LED.

At least one disclosed embodiment relates, in particular, in conjunction with one or more of the above-mentioned features, moreover to an operating device for a transportation vehicle, in particular, for operating a function of a transportation vehicle, wherein the operating device comprises a plurality of LEDs arranged adjacent to one another (in particular, essentially like a matrix), wherein a processing unit is provided to ascertain whether light of at least one first LED of the plurality of the LEDs is reflected and/or radiated because of an operating action at least into a second LED of the plurality of the LEDs, wherein the first LED has a first light emission spectrum predominantly in the infrared range and the second LED has a second light emission spectrum, wherein it is provided that the first light emission spectrum differs from the second light emission spectrum. In this context, a configuration having four different LEDs can also be used, of which one emits and/or senses essentially in the infrared range. The other three LEDs can emit and/or sense, for example, essentially in the visible range of the light. These three LEDs can emit and/or sense, for example, (in particular, predominantly or essentially) red, (in particular, predominantly or essentially) blue, and (in particular, predominantly or essentially) green.

At least one disclosed embodiment relates, in particular, in conjunction with one or more of the above-mentioned features, moreover to an operating device for a transportation vehicle, in particular, for operating a function of a transportation vehicle, wherein the operating device comprises a plurality of LEDs arranged adjacent to one another (in particular, essentially like a matrix), wherein the plurality of LEDs arranged adjacent to one another (in particular, essentially like a matrix) has at least one first LED having a first light emission spectrum, at least one second LED having a second light emission spectrum, at least one third LED having a third light emission spectrum and at least one fourth LED having a fourth light emission spectrum, wherein the at least first light emission spectrum differs from the at least second light emission spectrum, from the at least third light emission spectrum and from the at least fourth light emission spectrum, wherein the at least second light emission spectrum differs from the at least third light emission spectrum and from the at least fourth light emission spectrum, wherein the at least third light emission spectrum differs from the at least fourth light emission spectrum, wherein a processing unit is provided to ascertain whether light of the at least first LED is reflected and/or radiated because of an operating action into the at least second LED, into the at least third, and/or the at least fourth LED.

In at least one disclosed embodiment, the first light emission spectrum and at least the second light emission spectrum overlap. In at least one disclosed embodiment, the second light emission spectrum and at least the third light emission spectrum overlap. In at least one disclosed embodiment, the third light emission spectrum and at least the fourth light emission spectrum overlap. Overlapping in the meaning of this disclosure is to be understood to mean that a light emission spectrum intersects in the case of at least 50% or in the case of at least 30% of its maximum value the overlapping light emission spectrum in the case of at least 50% or in the case of at least 30% of its maximum value.

In a further disclosed embodiment, the LEDs of the plurality of the LEDs form a color display. In a further disclosed embodiment, the LEDs of the plurality of the LEDs are designed as a color display (for displaying different colored image contents). In a further disclosed embodiment, the display displays the function of the operating device, for example, as an icon or a symbol. In a further disclosed embodiment, the display is part of an HMI (human-machine interface), in particular, a multitouch HMI, for example, an encapsulated HMI, as is disclosed in FIG. 6, FIG. 7, and FIG. 8 of EP 1 764 674 B1, wherein the touchscreen 11 is omitted, however, and the transparent part 17 of the housing will be or is replaced by a fiber optical unit in the meaning of this disclosure. The determination of the location of a touch thus also takes place in the encapsulated region, namely in the already encapsulated display. A particularly robust multitouch-capable display and operating system possibly having haptic feedback is provided in this way, in particular, one which is also well usable for the outdoor area.

The disclosed embodiments, moreover, relate to a method for operating an operating device, in particular, for operating an above-mentioned operating device, wherein the operating device comprises a plurality of LEDs, wherein a fiber optical unit having a plurality of fibers is arranged above the plurality of the LEDs, wherein a first LED of the plurality of the LEDs radiates light into a fiber of the fiber optical unit, which is reflected (multiple times) in the fiber and exits from the surface of the fiber optical unit or the fiber facing away from the first LED, wherein a finger of an operator touches or nearly or almost touches the fiber optical unit on the surface of the fiber optical unit facing away from the first LED for the purpose of operating the operating device, wherein light, which exits from the surface of the fiber optical unit or the first fiber facing away from the first LED and which is (diffusely) reflected from the finger and thus radiated into fiber of the fiber optical unit, is conducted therefrom to an LED, which is not currently illuminated, of the plurality of the LEDs, such that the second LED supplies a signal, on the basis of which it is decided whether an operation of the operating device was performed.

The disclosed embodiments, moreover, relate to a transportation vehicle which comprises an above-mentioned operating device. Transportation vehicle in the meaning of the disclosure is a land vehicle usable individually in road traffic. Transportation vehicles in the meaning of the disclosure are not restricted to land vehicles having internal combustion engine. A transportation vehicle in the meaning of this disclosure can also be understood to mean a motor-driven vehicle, for example, also a vehicle for 3D mobility.

Figure 2:
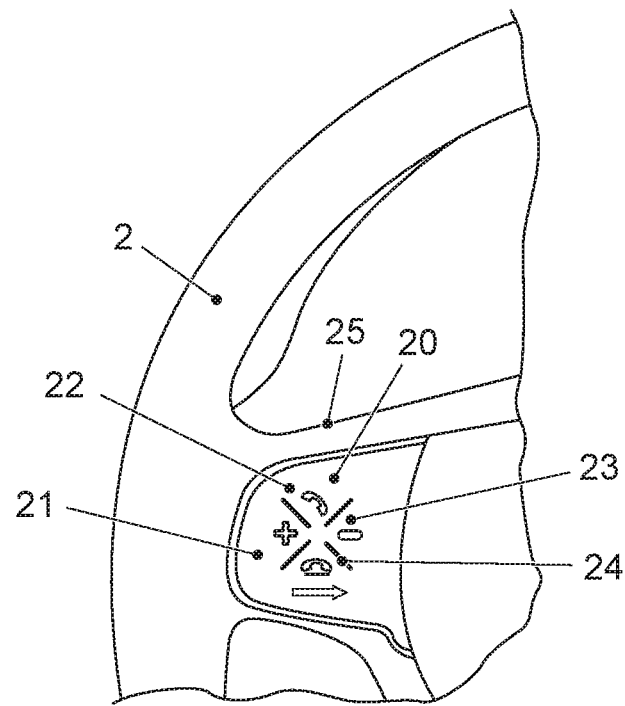
FIG. 2 shows a detailed view of the steering wheel of the transportation vehicle of FIG. 1.
Figure 3:
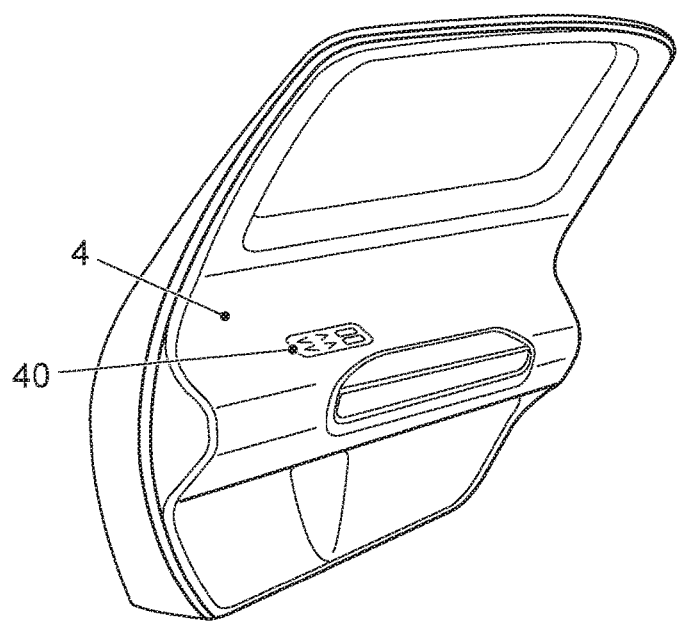
FIG. 3 shows a detailed view of a door of the transportation vehicle of FIG. 1.
Figure 4:
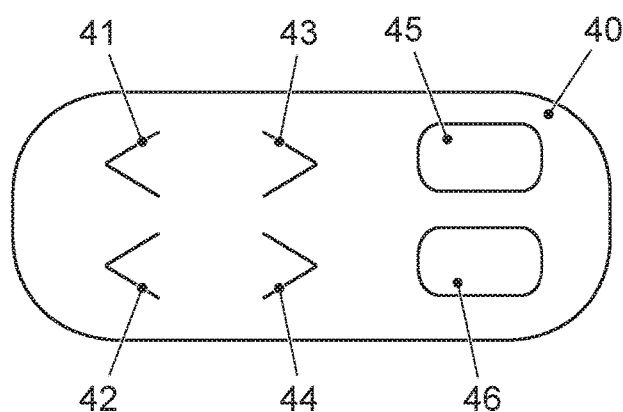
FIG. 4 shows a detailed view of operating elements of the door of FIG. 3.
Figure 5:
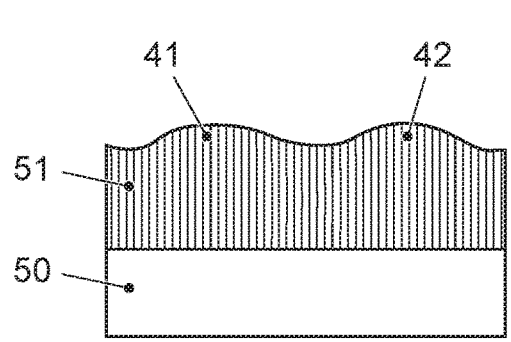
FIG. 5 shows operating elements of FIG. 3 in an enlarged cross-sectional view in a simplified illustration.
Figure 6:
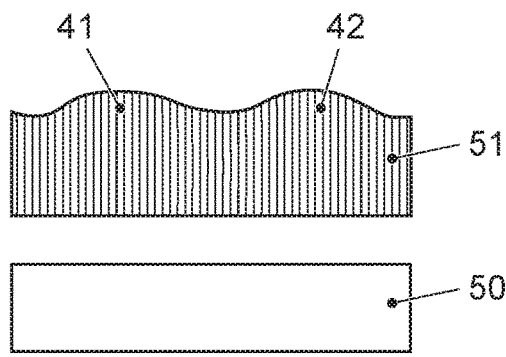
FIG. 6 shows alternatively-designed operating elements of FIG. 3 in an enlarged cross-sectional view in a simplified illustration.

FIG. 1 shows an exemplary embodiment of a transportation vehicle 1 in an interior view. In this case, the reference sign 2 denotes a steering wheel and reference sign 3 denotes an HMI. Reference sign 4 denotes a door, and an operating element in the center console of the transportation vehicle 1 is denoted by reference sign 5. FIG. 2 shows—based on EP 2 981 446 B1—a detail of the steering wheel 2 from FIG. 1 having an enlarged illustration of an operating region 20 having operating elements 21, 22, 23, 24 and being arranged in the region of the spoke 25 of the steering wheel 2 for the operation and function of the transportation vehicle 1. In the present exemplary embodiment, the operating elements 24 and 25 are used for operating a telephone. Varying the volume of the telephone signal by the operating elements 21 and 23 is provided. FIG. 3 shows the door 4 in an enlarged illustration. An operating panel 40, which is illustrated enlarged in FIG. 4, having window lifter operating elements 41, 42, 43, 44 and operating elements 45 and 46 for folding in the side mirrors of the transportation vehicle 1 is provided in the door 4. FIG. 5 and FIG. 6 show the operating panel 40 in an enlarged cross-sectional view in simplified form. The operating panel comprises an LED arrangement 50 and a fiber optical unit 51 arranged above the LED arrangement 50, wherein these can also be arranged spaced apart from one another, as shown in FIG. 6. The fiber optical unit 51 is convexly curved having a concave transition to simulate the haptics of an operating element in the region of the window lifters 41, 42.

Figure 7:
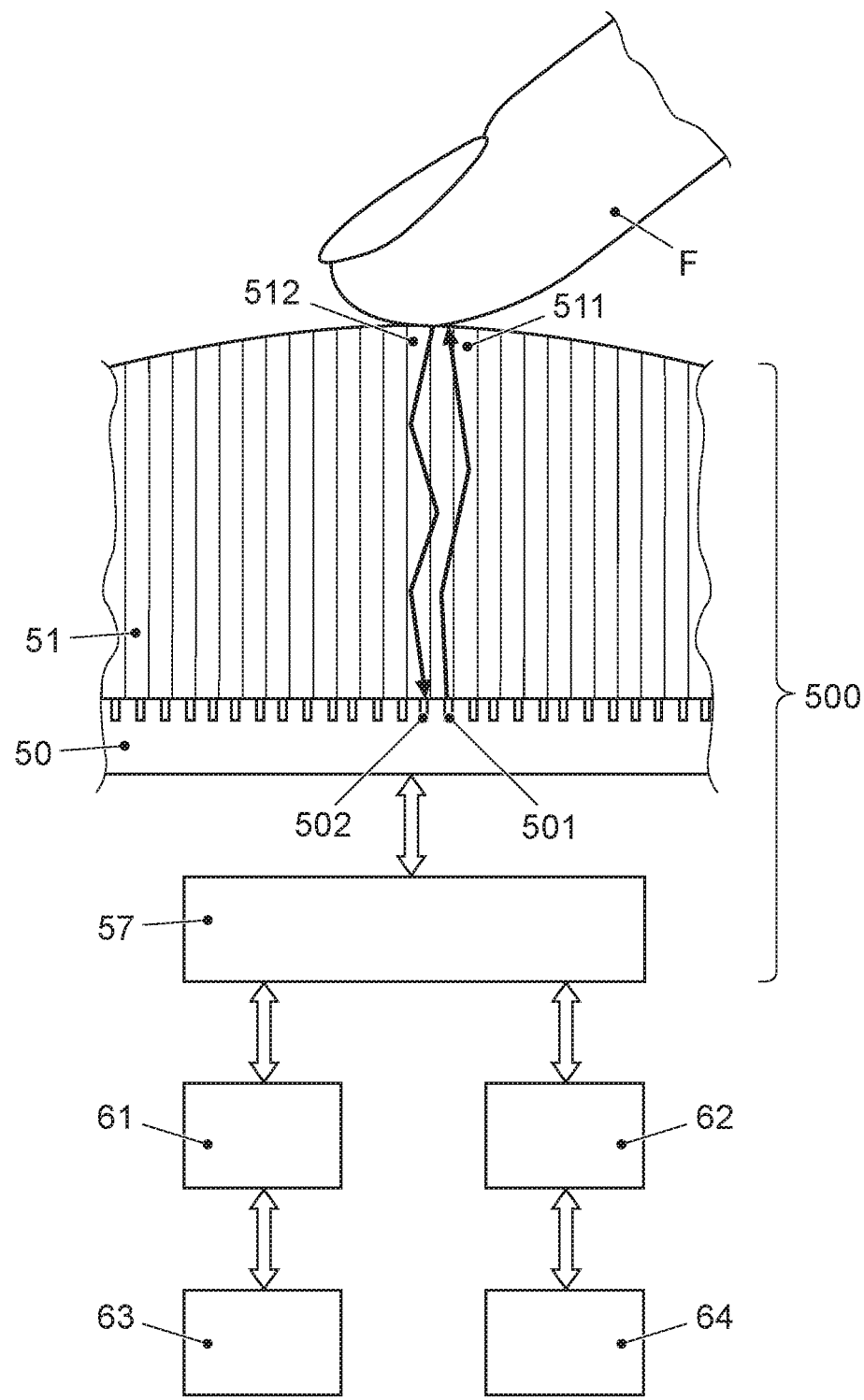
FIG. 7 shows an exemplary embodiment of an operating device using the operating elements of FIG. 3.

FIG. 7 shows the fundamental design of an operating device 500 in the meaning of the disclosure on the basis of the example of the operating panel 40. In this case, an LED 501 of the LED arrangement 50 designed as a display emits light which, after multiple reflections in a fiber 511 of the fiber optical unit 51, exits from the side of the fiber optical unit 51 facing away from the LED arrangement 50. If the finger F of an operator is located on the surface of the fiber optical unit 51 facing away from LED arrangement 50 for the purpose of operating the operating device 500, the light exiting from the surface is thus (diffusely) reflected into the fiber 511 of the fiber optical unit 51. The light exiting diffusely from the fiber 511 is radiated into at least one LED 502, which is adjacent to the emitting LED 501 and is presently not illuminating. The light incidence in the receiving LED 502 is communicated to a processing unit 57. The processing unit 57 can decide that a touching operation of the corresponding operating element of the operating device 500 was performed. The processing unit 57 of the operating device 500 communicates with the functions of the transportation vehicle 1 which are to be operated and/or controlled, such as, for instance, a controller 61 of the window lifters 63 for corresponding movement of the windows or a controller 62 of the side mirrors 64 for folding in the side mirrors 64.

Figure 8:
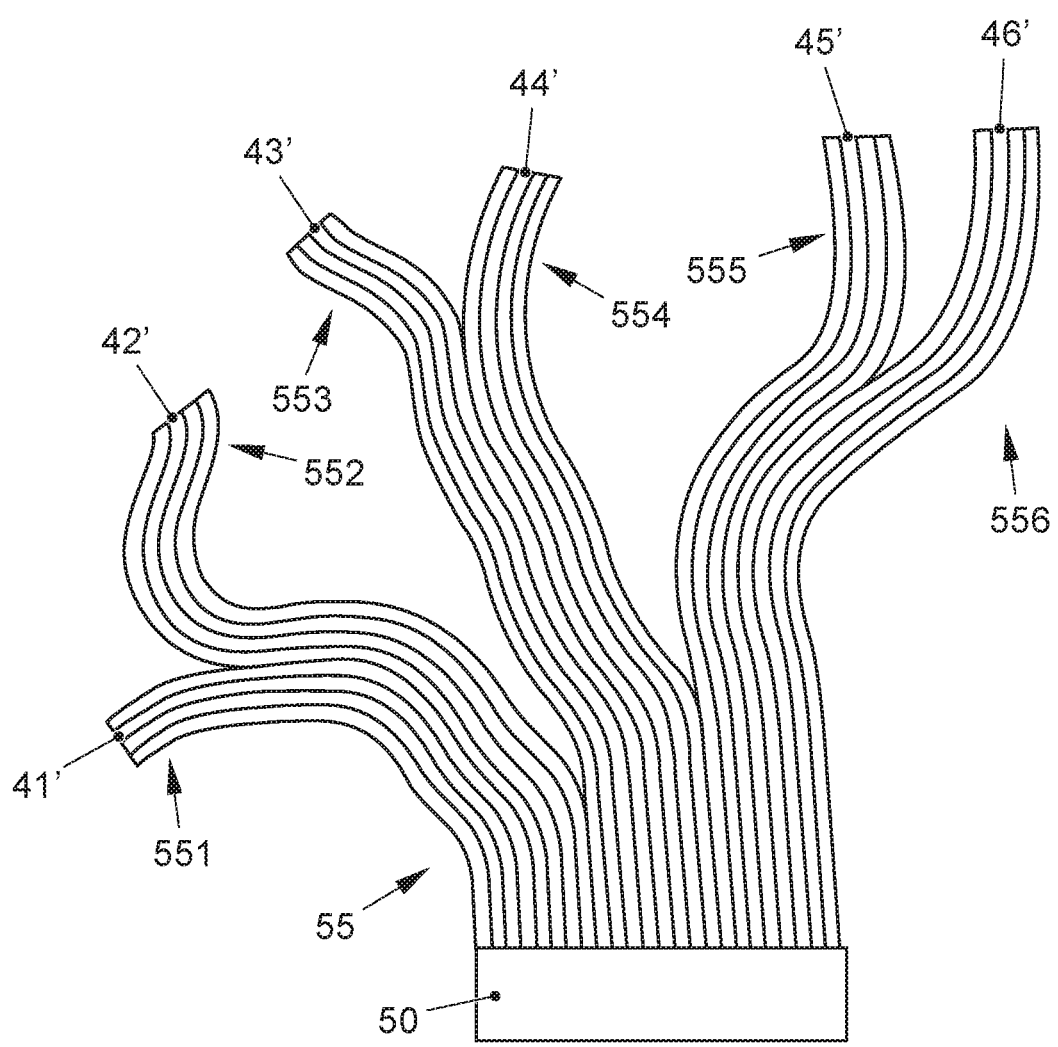
FIG. 8 shows further alternatively-designed operating elements of FIG. 3 in a simplified illustration.

FIG. 8 shows an alternative exemplary embodiment of the fiber optical unit of the operating device 500, wherein the arrangement 50 is not supplemented with a fiber optical unit designed as a fiber plate, but rather by a fiber bundle 55 having partial fiber bundles 551, 552, 553, 554, 555 and 556. In this case, the operating surfaces 41', 42', 43' and 44' at the end of the partial fiber bundles 551, 552, 553 and 554 correspond to the window lifter operating elements 41, 42, 43 and 44, and the operating surfaces 45' and 46' at the end of the partial fiber bundles 555 and 556 correspond to the operating elements 45 and 46 for folding in the side mirrors 64. Due to the design as fiber bundles 55, additional degrees of freedom result in the arrangement of the operating surfaces 41', 42', 43' and 44'. They thus do not have to be arranged adjacent to one another. The operating surfaces 41', 42', 43' and 44' can also be arranged remotely from one another. The operating surfaces 41', 42', 43' and 44' can also be arranged in more complex, nonplanar structural forms. For example, the operating surfaces 41', 42', 43' and 44' can be arranged on a three-dimensional structure, such as a cylindrical structure or a spherical structure or a free-form surface. The operating surfaces 41', 42', 43' and 44' can face in various directions of the three-dimensional structure.

The operating elements 5, 21, 22, 23 and 24 can be integrated into an operating device corresponding to the operating device 500 and can accordingly be part of a fiber optical unit. It can also be provided that the operating elements 5, 21, 22, 23 and 24 are embodied as softkeys, so that the operating elements 5, 21, 22, 23 and 24 operate different functions depending on context. It can be provided in this case that the LED arrangement 50 generates symbols or icons which are visible on the respective operating elements 5, 21, 22, 23 and 24, and thus display the current functionality of the respective operating element 5, 21, 22, 23 and 24. In a similar manner, the HMI 3 can also become or be provided with a fiber optical unit provided as a fiber plate.

Figure 9:
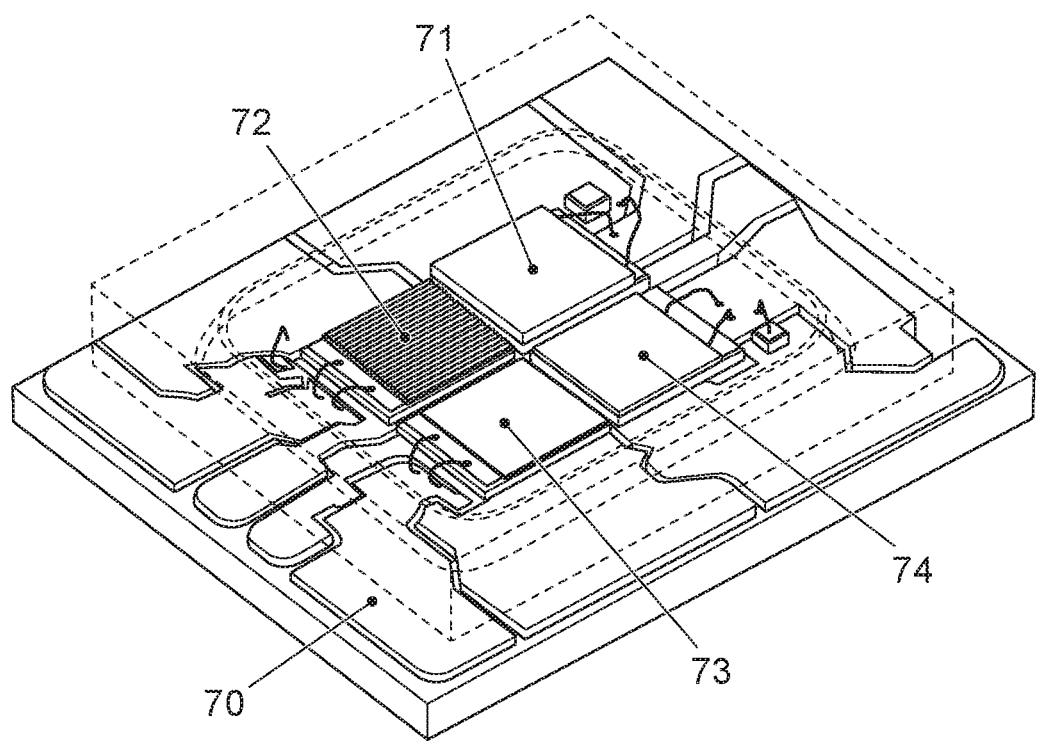
FIG. 9 shows an exemplary embodiment of an alternative LED arrangement.
Figure 10:
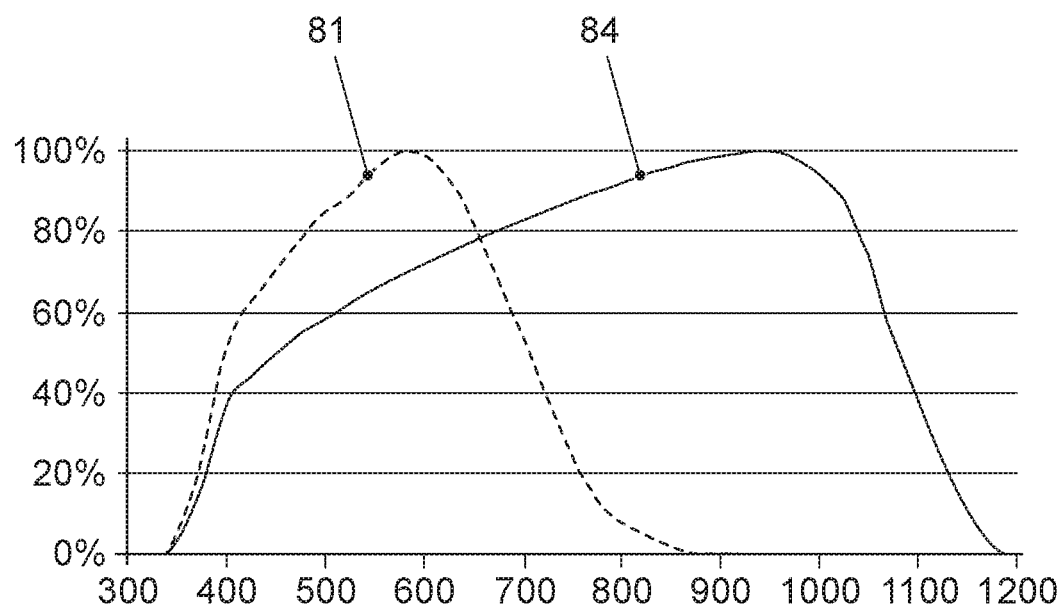
FIG. 10 shows an exemplary embodiment of overlapping sensitivities.

FIG. 9 shows an exemplary embodiment of an alternative LED arrangement 70 having four LEDs 71, 72, 73, 74 having different light emission spectra. It is provided in this case that the LED 74 predominantly emits light in the infrared range. In this manner, for example, an operating element, such as the window lifter operating element 41, can be operated in 2 operations in such a way that firstly a touch takes place in the region of the operating panel 40 without the underlying function being called up. Rather, this has the result that the operating panel 40 enters readiness and lights up in the visible range in this case. If the window lever operating element 41 is touched in this state, the underlying function, i.e., the movement of the pane, is thus executed. To implement a particularly suitable mutual use of the LEDs 71 and 74 alternately as the receiving LED and emitting LED, the light emission spectra thereof overlap, as shown on the basis of the sensitivities 81 and 84 in FIG. 10.

The elements and fibers in FIGS. 5 to 8 are not necessarily shown to scale and in consideration of simplicity and clarity. Thus, for example, the orders of magnitude of several elements or fibers are shown significantly exaggerated in relation to other elements or fibers to improve the comprehension of the exemplary embodiments of the disclosure.

The invention claimed is:

1. An operating device for a transportation vehicle for operating a function of a transportation vehicle, the operating device comprising:
   a plurality of LEDs arranged adjacent to one another;
   a processing unit; and
   a fiber optical unit arranged above the plurality of LEDs, the fiber optical unit comprising a plurality of light guides which, at least on a side of the fiber optical unit facing toward the plurality of the LEDs is aligned to the side of the fiber optical unit facing toward the plurality of the LEDs,
   wherein the processing unit is configured to ascertain whether light of at least one first LED of the plurality of the LEDs is reflected and/or radiated because of an operating action at least into a second LED of the plurality of the LEDs,
   wherein a first LED of the plurality of the LEDs radiates light into a fiber of the fiber optical unit, which is reflected multiple times in the first fiber and exits from a surface of the fiber optical unit and/or the fiber facing away from the first LED,
   wherein a finger of an operator touches or nearly touches the fiber optical unit on the surface of the fiber optical unit facing away from the first LED to operate the operating device, and
   wherein light, which exits from the surface of the fiber optical unit or the fiber facing away from the first LED and which is reflected from the finger and radiates into the fiber of the fiber optical unit, is conducted therefrom to a second LED which is not currently illuminated and is adjacent to the first LED of the plurality of the LEDs, such that the second LED supplies a signal, on the basis of which it is decided whether an operation of the operating device was performed.

2. The operating device of claim 1, wherein the fiber optical unit comprises a side facing positioned toward the plurality of the LEDs and a side facing positioned away from the plurality of the LEDs, wherein the side facing positioned away from the plurality of the LEDs comprises a curved region.

3. The operating device of claim 1, wherein the fiber optical unit splits into at least two partial fiber bundles in the direction toward the side facing away from the plurality of the LEDs.

4. The operating device of claim 1, wherein the first LED has a first light emission spectrum and the second LED has a second light emission spectrum, wherein the first light emission spectrum differs from the second light emission spectrum.

5. The operating device of claim 1, wherein the first LED has a first light emission spectrum predominantly in the infrared range and the second LED has a second light emission spectrum, wherein the first light emission spectrum differs from the second light emission spectrum.

6. The operating device of claim 5, wherein the first light emission spectrum and the second light emission spectrum overlap.

7. The operating device of claim 1, wherein the LEDs of the plurality of the LEDs form a color display.

8. A transportation vehicle comprising the operating device of claim 1.

9. A method for operating an operating device for a transportation vehicle for operating a function of the transportation vehicle, wherein the operating device includes a plurality of LEDs, wherein a fiber optical unit is arranged above the plurality of the LEDs, the method comprising:
   a first LED of the plurality of the LEDs radiating light into a fiber of the fiber optical unit, which is reflected multiple times in the first fiber and exits from a surface of the fiber optical unit, and/or the fiber facing away from the first LED, wherein a finger of an operator touches or nearly touches the fiber optical unit on the surface of the fiber optical unit facing away from the first LED for the purpose of operating the operating device;

conducting light, which exits from the surface of the fiber optical unit or the fiber facing away from the first LED and which is reflected from the finger and thus radiated into the fiber of the fiber optical unit, therefrom to a second LED, which is not currently illuminated and is adjacent to the first LED, of the plurality of the LEDs, such that the second LED supplies a signal; and based on the signal, deciding whether an operation of the operating device was performed.

10. The method of claim 9, wherein the fiber optical unit includes a side facing toward the plurality of the LEDs and a side facing away from the plurality of the LEDs, wherein the side facing away from the plurality of the LEDs comprises a curved region.

11. The method of claim 9, wherein the fiber optical unit splits into at least two partial fiber bundles in the direction toward the side facing away from the plurality of the LEDs.

12. The method of claim 9, wherein the first LED has a first light emission spectrum and the second LED has a second light emission spectrum, wherein the first light emission spectrum differs from the second light emission spectrum.

13. The method of claim 9, wherein the first LED has a first light emission spectrum predominantly in the infrared range and the second LED has a second light emission spectrum, wherein the first light emission spectrum differs from the second light emission spectrum.

14. The method of claim 13, wherein the first light emission spectrum and the second light emission spectrum overlap.

15. The method of claim 9, wherein the LEDs of the plurality of the LEDs form a color display.

* * * * *